United States Patent
Lin et al.

(10) Patent No.: US 9,395,571 B2
(45) Date of Patent: Jul. 19, 2016

(54) TOUCH DISPLAY PANEL AND TOUCH DISPLAY APPARATUS

(71) Applicant: InnoLux Corporation, Jhu-Nan, Miao-Li County (TW)

(72) Inventors: Kuan-Li Lin, Jhu-Nan (TW); Chih-Jen Chang, Jhu-Nan (TW); Ching-I Lo, Jhu-Nan (TW); Wen-Jyh Sah, Jhu-Nan (TW); Tien-Jen Lin, Jhu-Nan (TW); Cheng-Hsia Kuo, Jhu-Nan (TW); Ying-Chia Fu, Jhu-Nan (TW)

(73) Assignee: InnoLux Corporation, Jhu-Nan, Miao-Li County (TW)

( * ) Notice: Subject to any disclaimer, the term of this patent is extended or adjusted under 35 U.S.C. 154(b) by 92 days.

(21) Appl. No.: 14/167,801

(22) Filed: Jan. 29, 2014

(65) Prior Publication Data
US 2014/0218639 A1    Aug. 7, 2014

Related U.S. Application Data

(60) Provisional application No. 61/759,840, filed on Feb. 1, 2013.

(30) Foreign Application Priority Data

Mar. 12, 2013  (TW) .................................. 102108704
Jul. 12, 2013   (CN) ........................... 2013 1 0293935

(51) Int. Cl.
*G02F 1/1333* (2006.01)
*G02F 1/1345* (2006.01)

(52) U.S. Cl.
CPC ........ *G02F 1/13338* (2013.01); *G02F 1/13452* (2013.01)

(58) Field of Classification Search
CPC .................................................. G02F 1/13452
See application file for complete search history.

(56) References Cited

U.S. PATENT DOCUMENTS

| | | | |
|---|---|---|---|
| 2006/0193117 A1* | 8/2006 | Miyata ........................ | 361/749 |
| 2008/0246744 A1* | 10/2008 | Park et al. .................... | 345/173 |
| 2012/0098774 A1* | 4/2012 | Abe et al. ..................... | 345/173 |
| 2012/0218696 A1* | 8/2012 | Kim et al. ................ | 361/679.01 |
| 2012/0313889 A1* | 12/2012 | Chen et al. ................... | 345/174 |
| 2013/0169593 A1* | 7/2013 | Imamura et al. ............. | 345/174 |

FOREIGN PATENT DOCUMENTS

| | | |
|---|---|---|
| CN | 1777923 (A) | 5/2006 |
| CN | 102033635 (A) | 4/2011 |
| CN | 102279480 A | 12/2011 |
| CN | 102479012 A | 5/2012 |
| CN | 102629020 (A) | 8/2012 |
| JP | 2012033135 A  * | 2/2012 |
| WO | WO2012118300 (A2) | 9/2012 |

* cited by examiner

*Primary Examiner* — Michael Caley
*Assistant Examiner* — Edmond Lau
(74) *Attorney, Agent, or Firm* — Muncy, Geissler, Olds & Lowe, P.C.

(57) ABSTRACT

A touch display panel comprises a display panel, a touch panel and a circuit connection board. The display panel includes a first substrate and a second substrate which are disposed oppositely. The touch panel is disposed over the display panel. The circuit connection board is disposed on the touch panel and physically and electrically connected to the touch panel. At least a portion of the circuit connection board overlaps the first substrate in a direction perpendicular to the display panel. A touch display apparatus is also disclosed.

19 Claims, 17 Drawing Sheets

TOUCH DISPLAY PANEL AND TOUCH DISPLAY APPARATUS

CROSS REFERENCE TO RELATED APPLICATIONS

The non-provisional patent application claims priority to U.S. provisional patent application with Ser. No. 61/759,840 filed on Feb. 1, 2013, patent application No(s). 102108704 filed in Taiwan, Republic of China on Mar. 12, 2013, and patent application No(s). 201310293935.9 filed in People's Republic of China on Jul. 12, 2013. This and all other extrinsic materials discussed herein are incorporated by reference in their entirety.

BACKGROUND OF THE INVENTION

1. Field of Invention

The invention relates to a touch display panel and a touch display apparatus and, in particular, to an on cell touch display panel and apparatus.

2. Related Art

With the progress of technologies, various novel information apparatuses, such as cell phones, tablet computers, ultrabooks and GPS navigation apparatuses, are invented. Generally, a keyboard and mouse are commonly used to manipulate the information apparatus for inputting information. Nevertheless, the touch control technology currently also becomes a popular manipulation method for the information apparatus and brings an intuitive operation. Accordingly, a touch display apparatus using the touch control technology can provide a friendly and intuitive interface for the input operation, and therefore a user can manipulate the touch display apparatus by fingers or a stylus.

In general, the touch display apparatus can be divided into an in cell touch display apparatus and an on cell touch display apparatus. In the in cell touch display apparatus, a sensing electrode layer is disposed in a display panel (e.g. LCD panel); otherwise, in the on cell touch display apparatus, a touch panel is disposed on a display panel.

SUMMARY OF THE INVENTION

An objective of the invention is to provide a touch display panel and apparatus with an innovative structure.

A touch display panel according to the invention comprises a display panel, a touch panel and a circuit connection board. The display panel includes a first substrate and a second substrate which are disposed oppositely. The touch panel is disposed over the display panel. The circuit connection board is disposed on the touch panel and physically and electrically connected to the touch panel. At least a portion of the circuit connection board overlaps the first substrate in a direction perpendicular to the display panel.

A touch display apparatus according to the invention comprises a touch display panel and a backlight module. The touch display panel includes a display panel, a touch panel and a circuit connection board. The display panel includes a first substrate and a second substrate which are disposed oppositely, the touch panel is disposed over the display panel, the circuit connection board is disposed on the touch panel and physically and electrically connected to the touch panel, and at least a portion of the circuit connection board overlaps the first substrate in a direction perpendicular to the display panel. The backlight module is disposed on the side of the display panel away from the touch panel.

In one embodiment, the circuit connection board overlaps the second substrate in a direction perpendicular to the display panel.

In one embodiment, the area of the touch panel is less than or equal to that of the first substrate in a direction perpendicular to the display panel.

In one embodiment, the first substrate and the second substrate overlap each other.

In one embodiment, the touch panel and the display panel are staggered.

In one embodiment, the display panel further includes a first polarization plate and a second polarization plate, the first polarization plate is disposed on the side of the first substrate away from the second substrate, and the second polarization plate is disposed between the second substrate and the touch panel.

In one embodiment, the touch panel is disposed beyond an edge of the second polarization plate by a distance between 0.3 mm and 2 mm.

In one embodiment, the first substrate is disposed beyond an edge of the second polarization plate by a distance having a maximum of 5 mm.

In one embodiment, the gap between the touch panel and the second polarization plate is less than or equal to 0.1 mm.

In one embodiment, the display panel includes a driving circuit board, and the touch panel is electrically connected to the driving circuit board through the circuit connection board.

In one embodiment, a buffer element is disposed between the display panel and the touch panel and has a first width, the first substrate has a second width, and the first width is greater than the second width.

In one embodiment, the touch display apparatus further comprises a plastic frame and a rear frame. The plastic frame is adjacent to the backlight module. The display panel and the touch panel are disposed to the plastic frame. The plastic frame, backlight module, display panel and touch display are disposed to the rear frame.

In one embodiment, the touch display apparatus further comprises an adhesive element and a rear frame. The touch panel, display panel and/or backlight module are connected together by the adhesive element. The adhesive element, backlight module, display panel and touch display are disposed to the rear frame.

In one embodiment, the plastic frame and the rear frame are connected to each other by locking or adhering.

In one embodiment, the touch display apparatus further comprises a light blocking element disposed at the outside of the rear frame.

In one embodiment, the touch display apparatus further comprises a front frame. The front frame is disposed at an edge of the touch display panel and includes a blocking portion which is disposed above the touch display panel and has a surface. An angle is formed between an extension of the surface and an upper surface of the touch display panel and is between 5° and 30°.

A touch display panel according to the invention comprises a display panel, a touch panel and a circuit connection board. The display panel includes a first substrate and a second substrate which are disposed oppositely. The touch panel is disposed over the display panel and staggered with the display panel. The circuit connection board is disposed on the touch panel and physically and electrically connected to the touch panel. At least a side of the touch panel is disposed between the first substrate and the second substrate in a direction perpendicular to the display panel.

As mentioned above, in the touch display panel and touch display apparatus according to the invention, the touch panel is disposed over the display panel, and the circuit connection board is disposed on the touch panel and physically and electrically connected to the touch panel. Moreover, in a direction perpendicular to the display panel, at least a portion of the circuit connection board overlaps the first substrate of the display panel, or at least one side of the touch panel is disposed between the first substrate and the second substrate. Thereby, in comparison with the conventional on cell touch display panel and apparatus, the on cell touch display panel and apparatus of this invention are configured with innovative structures.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
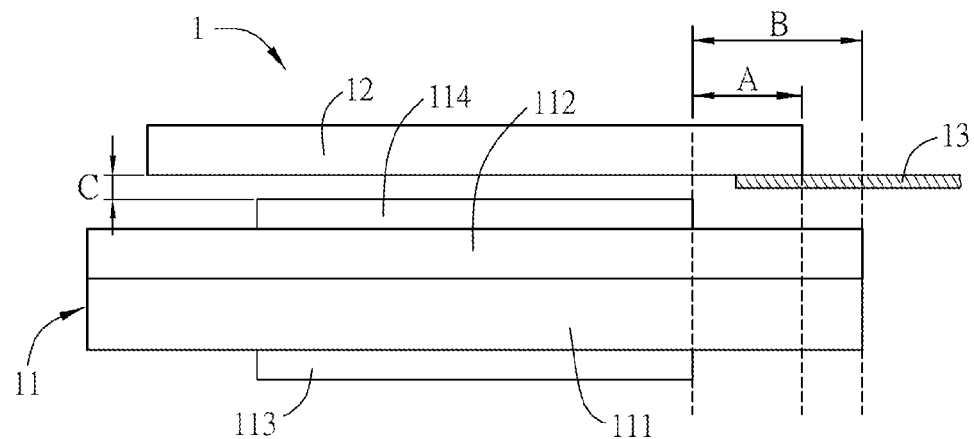
FIG. 1 is a schematic diagram of a touch display panel according to a preferred embodiment of the invention.

FIG. 1 is a schematic diagram of a touch display panel 1 according to a preferred embodiment of the invention.

The touch display panel 1 includes a display panel 11, a touch panel 12 and a circuit connection board 13.

The display panel 11 includes a first substrate 111 and a second substrate 112. The first substrate 111 and the second substrate 112 are disposed oppositely. The materials of the first substrate 111, second substrate 112 and touch panel 12 can include glass, and they can be made by the same or different glass. The first substrate 111 and the second substrate 112 can have the same or different areas, and herein for example, they have the same area and overlap each other. In this embodiment, the first substrate 111 is a thin film transistor (TFT) substrate, and the second substrate 112 is a color filter (CF) substrate, for example. However, in other embodiments, the black matrix layer or filter layer of the color filter substrate also can be removed to the TFT substrate, and thus the first substrate 111 becomes a BOA (BM on array) substrate or COA (color filter on array) substrate. However, the invention is not limited thereto. Besides, the display panel 11 can further include a liquid crystal layer (not shown), which is disposed between the first and second substrates 111 and 112, and thus the display panel 11 is a liquid crystal display (LCD) panel.

The display panel 11 further includes a first polarization plate 113 and a second polarization plate 114. The first polarization plate 113 is disposed on the side of the first substrate 111 away from the second substrate 112, and the second polarization plate 114 is disposed between the second substrate 112 and the touch panel 12. Herein, the first polarization plate 113 is a lower polarization plate and disposed on the lower surface of the first substrate 111, and the second polarization plate 114 is an upper polarization plate and disposed on the upper surface of the second substrate 112. In this embodiment, the area of the first polarization plate 113 is less than that of the first substrate 111, and the area of the second polarization plate 114 is less than that of the second substrate 112. However, in other embodiments, the area of the first polarization plate 113 can be equal to that of the first substrate 111, and the area of the second polarization plate 114 can be equal to that of the second substrate 112.

The touch panel 12 is disposed over the display panel 11. Herein, the touch panel 12 is disposed opposite the display panel 11, and can be disposed over the display panel 11 by adhesion or other connection structures or methods. The touch panel 12 and the second polarization plate 114 can be connected to each other by an adhesive element (not shown) in a direct bonding way for example. Otherwise, the touch panel 12 and the second polarization plate 114 don't contact each other, but the touch panel 12 and the display panel 11 are connected to each other in an air bonding way for example. As to the air bonding, an adhesive element is annularly disposed on the four edges or just a portion of the edges of the upper surface of the second substrate 112, or is disposed in a paste dispensing way, for connecting the touch panel 12 and the display panel 11. Since the second polarization plate 114 is less than the second substrate 112 in area and is disposed between the second substrate 112 and the touch panel 12 so as to be surrounded by the adhesive element, a gap is formed between the second polarization plate 114 and the touch panel 12. Besides, in a direction perpendicular to the display panel 11, the area of the touch panel 12 can be less than, equal to or greater than that of the first substrate 111.

The circuit connection board 13 is disposed on and bonded to the touch panel 12 for the mutual electrical connection. Herein, the circuit connection board 13 is connected to the lower surface of the touch panel 12 to be electrically connected to the touch panel 12. Besides, at least a portion of the circuit connection board 13 overlaps the first substrate 111. In other words, for a top view of the touch panel 12, at least a portion of the circuit connection board 13 is disposed over the first substrate 111. A driving circuit for driving the touch panel 12 is electrically connected to the circuit connection board 13 so as to control the touch panel 12 through the circuit connection board 13. Herein, the circuit connection board 13 is, for example but not limited to, a flexible printed circuit (FPC) board or rigid-flex board.

Besides, in a direction perpendicular to the display panel 11, the circuit connection board 13 and the second substrate 112 can overlap each other or not, and herein they overlap each other for example. In other words, because the first and second substrates 111 and 112 have the same area and overlap each other, the circuit connection board 13 overlaps both of the first and second substrates 111 and 112. Moreover, the circuit connection board 13 doesn't overlap the second polarization plate 114. Therefore, the gap between the touch panel 12 and the second substrate 112 can be kept smaller so that the touch display panel 1 can be thinned more.

As shown in FIG. 1, the right side of the touch panel 12 is disposed beyond an edge of second polarization plate 114 (but not beyond an edge of the second substrate 112) by a distance A such as between 0.3 mm and 2 mm. The right side of the first substrate 111 is disposed beyond an edge of the second polarization plate 114 by a distance B which has a maximum of 5 mm. When the distance B is equal to zero, it means that the second polarization plate 114 and the first substrate 111 have the same area and are aligned with each other. The gap C between the touch panel 12 and the second polarization plate 114 is less than or equal to 0.1 mm. Because the gap between the touch panel 12 and the second polarization plate 114 is sufficiently small, the deformation of the touch panel 12 caused by the touch control can be less than the prior art, and besides, the display panel 11 can be considered to support the touch panel 12 at a certain level. Therefore, the touch panel 12 is unnecessary to be further treated with a strengthening process. Moreover, because the circuit connection board 13 doesn't overlap the second polarization plate 114 but overlaps the first substrate 111 in a direction perpendicular to the display panel 11, the connection area between the touch panel 12 and the circuit connection board 13 can be decreased and thus the total dimensions (e.g. area) thereof can be reduced.

Figure 2:
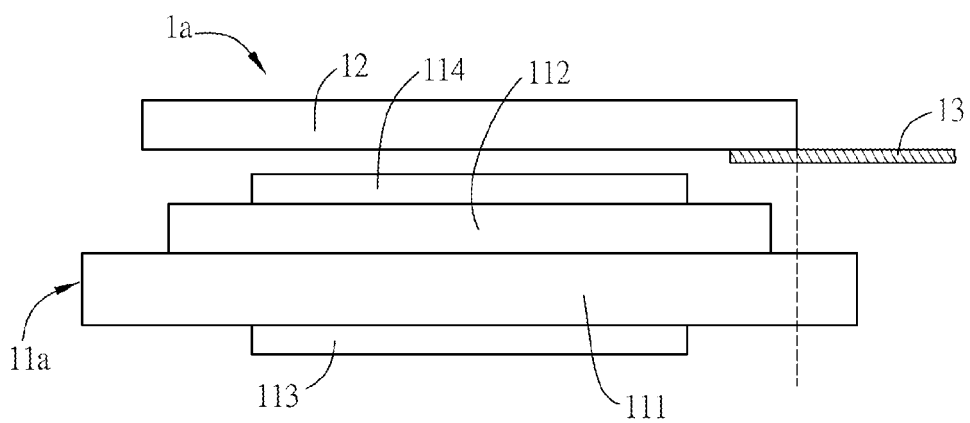
FIGS. 2 and 3 are schematic diagrams of the touch display panels as some variations according to the preferred embodiment of the invention.
Figure 3:
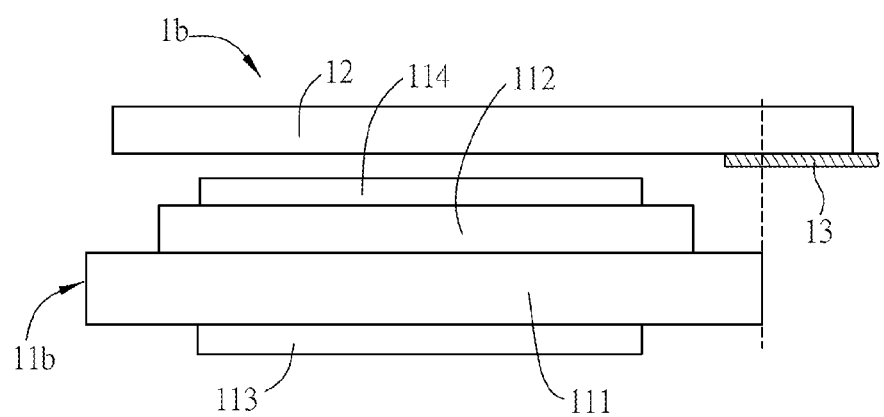

FIGS. 2 and 3 are schematic diagrams of the touch display panels 1a and 1b as some variations according to the preferred embodiment of the invention.

As shown in FIG. 2, mainly different from the touch display panel 1, the second substrate 112 of the touch display panel 1a is less than the first substrate 111 in area, so that the left and right sides of the first substrate 111 are disposed beyond the left and right sides of the second substrate 112, respectively.

As shown in FIG. 3, mainly different from the touch display panel 1, the touch panel 12 and the first substrate 111 of the display panel 11b of the touch display panel 1b are staggered, and besides, the circuit connection board 13 just overlaps the first substrate 111 but doesn't overlap the second substrate 112.

Figure 4A:
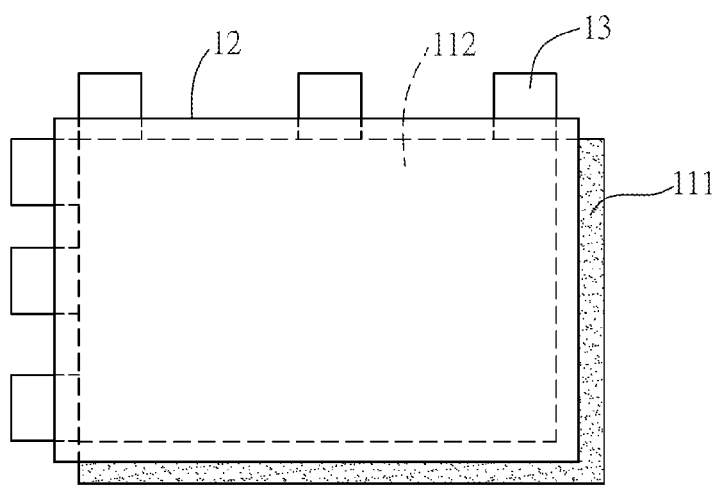
FIGS. 4A, 4B and 4C are schematic diagrams of some variations of the touch panel, first substrate and second substrate according to the invention.
Figure 4B:
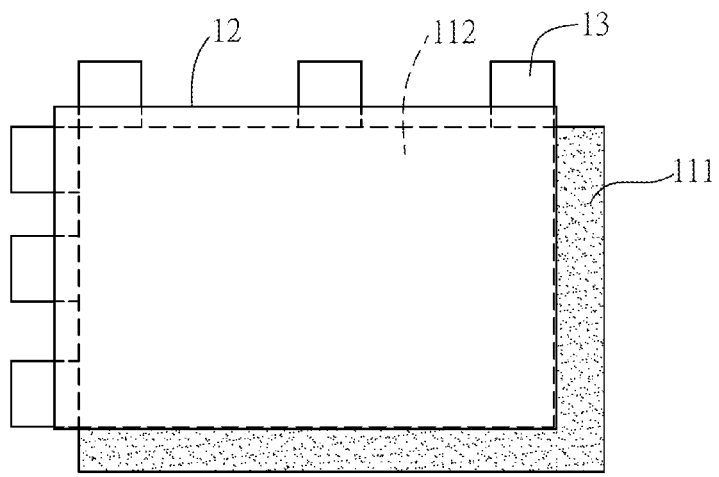
Figure 4C:
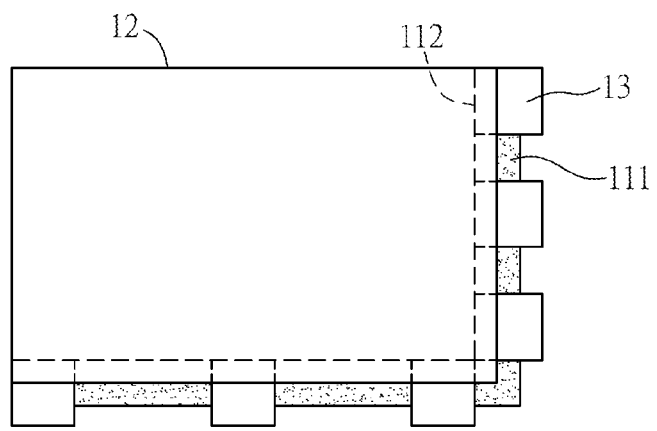

FIGS. 4A, 4B and 4C are schematic diagrams of some variations of the touch panel 12, first substrate 111 and second substrate 112 according to the invention. Herein, the area of the touch panel 12 is less than or equal to that of the first substrate 111. However, in other embodiments, the area of the touch panel 12 can be greater than that of the first substrate 111. Besides, the cases of FIGS. 4A to 4C are just for example but not for limiting the scope of the invention.

As shown in FIG. 4A, the touch panel 12 is disposed over the display panel (including the first substrate 111 and the second substrate 112), and the touch panel 12 and the display panel are staggered. The four sides of the touch panel 12 are not aligned with those of the first substrate 111, respectively. The area of the second substrate 112 is less than that of the first substrate 111, and two sides of the second substrate 112 are aligned with the corresponding sides of the first substrate 111, respectively. In this embodiment, the circuit connection board 13 is located at the left and top sides of the touch panel 12 in FIG. 4A. Otherwise, the circuit connection board 13 can be disposed at the right and bottom sides of the touch panel 12 of FIG. 4A. At least one of the sides of the touch panel 12 is disposed between the first substrate 111 and the second substrate 112. Herein for example, the two sides (right and bottom sides) of the touch panel 12 are located between the corresponding sides of the first substrate 111 and the second substrate 112, respectively.

As shown in FIG. 4B, the touch panel 12 is disposed over the display panel (including the first substrate 111 and the second substrate 112), and the touch panel 12 and the display panel are staggered. The four sides of the touch panel 12 are not aligned with those of the first substrate 111, respectively. The area of the second substrate 112 is less than that of the first substrate 111, and two sides (left and top sides) of the second substrate 112 are aligned with the corresponding sides of the first substrate 111, respectively.

As shown in FIG. 4C, two sides (left and top sides) of the touch panel 12 are aligned with the corresponding sides of the first substrate 111. The area of the second substrate 112 is less than that of the first substrate 111, and two sides (left and top sides) of the second substrate 112 are aligned with the corresponding sides of the first substrate 111 and touch panel 12, respectively. At least one of the sides of the touch panel 12 is disposed between the first substrate 111 and the second substrate 112. Herein for example, the two sides (right and bottom sides) of the touch panel 12 are located between the corresponding sides of the first substrate 111 and second substrate 112, respectively.

Figure 5A:
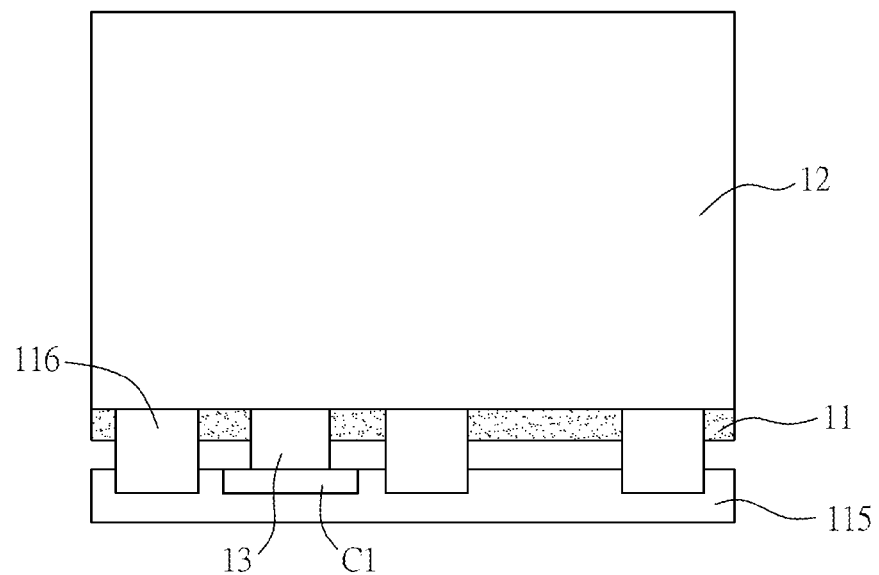
FIG. 5A is a schematic diagram showing the integration of the driving circuit of the touch panel and the driving circuit of the display panel according to this invention.

FIG. 5A is a schematic diagram showing the integration of the driving circuit of the touch panel 12 and the driving circuit of the display panel 11 according to this invention.

The display panel 11 can be electrically connected to a driving circuit board 115 through a circuit film 116 (e.g. chip on film, COF), and the touch panel 12 can be electrically connected to the driving circuit board 115 through the circuit connection board 13 and a connection element C1. Therefore, the driving circuits of the display panel 11 and touch panel 12 are integrated to the same driving circuit board 115.

Figure 5B:
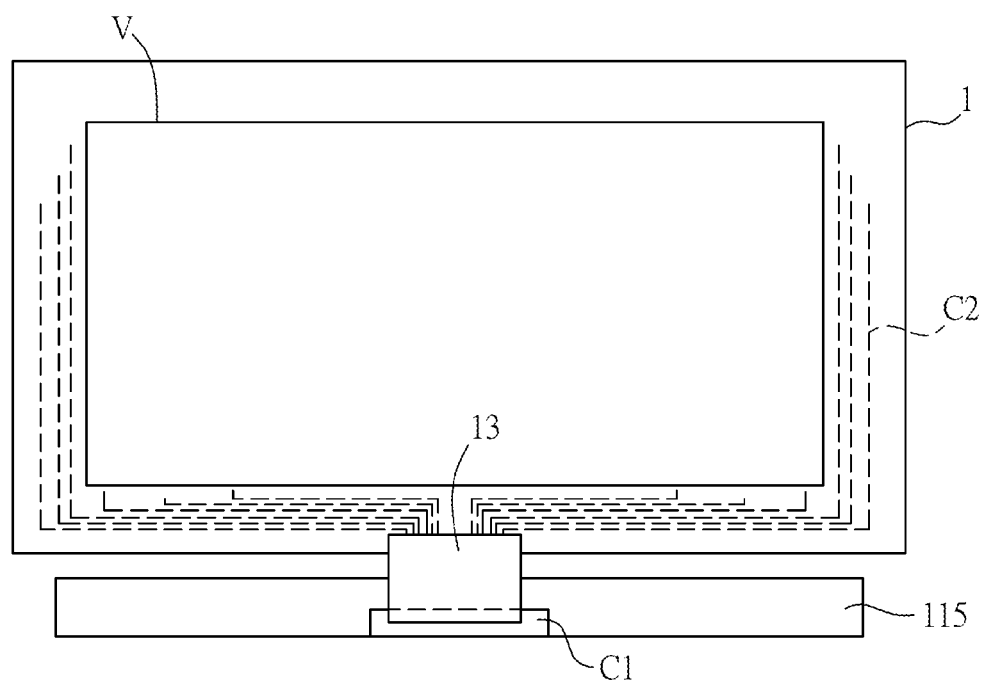
FIGS. 5B to 5D are schematic diagrams of some variations of the layout of the touch display apparatus according to this invention.
Figure 5C:
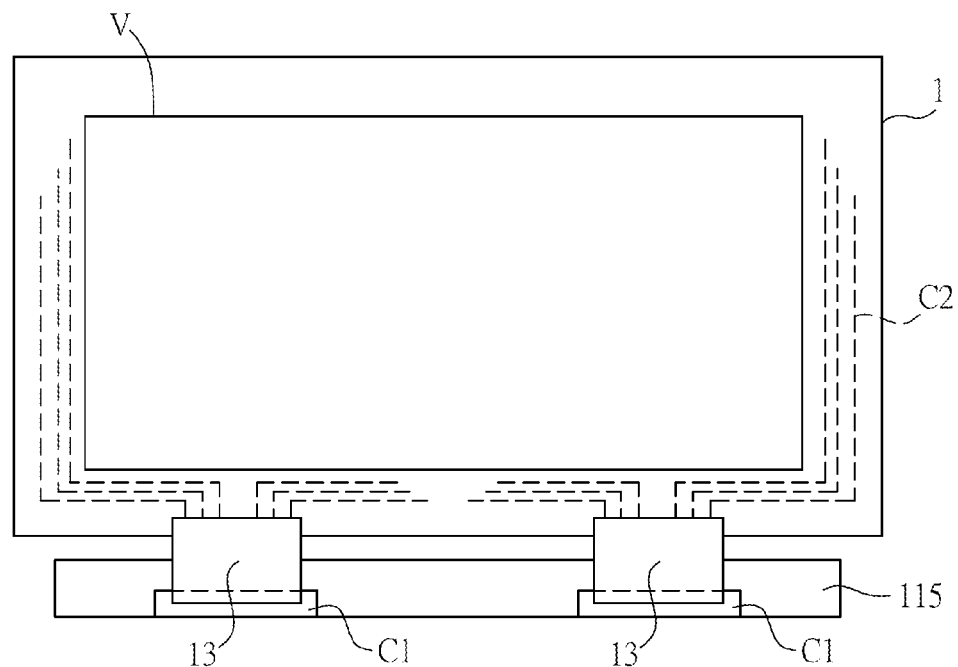
Figure 5D:
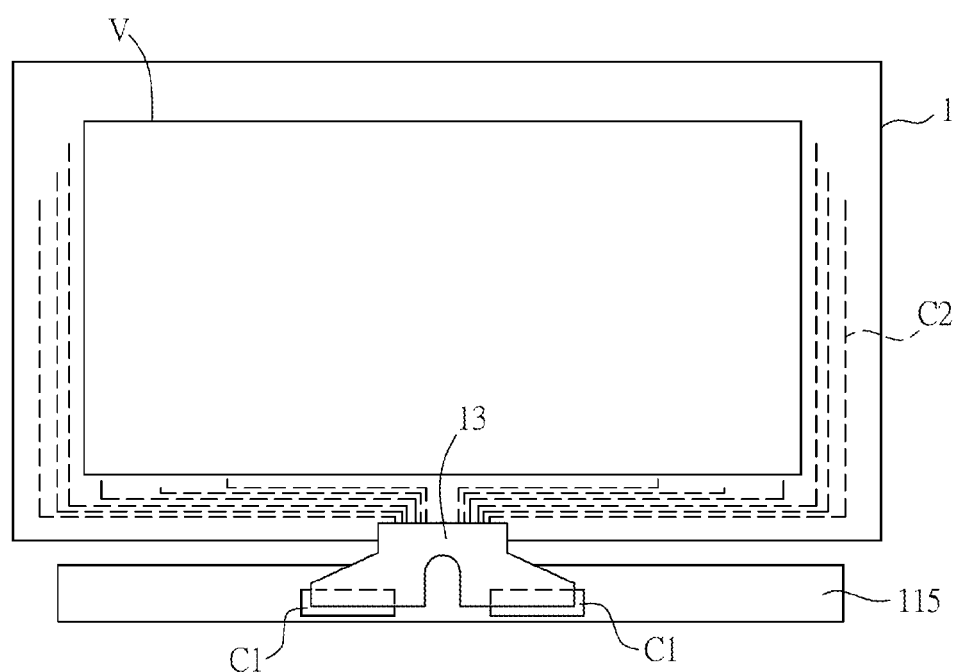

FIGS. 5B to 5D are schematic diagrams of some variations of the layout of the touch display apparatus 1 according to this invention. Herein, the touch display panel 1 is taken as an example, but the touch display panels 1a and 1b also can be applied in this manner.

The touch display panel 1 has a viewable area V. The viewable area V denotes the area which the light can pass through to cause images for the user. Herein, the driving circuits of the display panel 11 (not shown) and touch panel 12 (not shown) of the touch display panel 1 are integrated to the same driving circuit board 115.

As shown in FIG. 5B, the driving circuit board 115 is electrically connected to the touch display panel 1 through a connection element C1, a circuit connection board 13 and a plurality of wires C2. As shown in FIG. 5C, the driving circuit board 115 is electrically connected to the touch display panel 1 through two connection elements C1, two circuit connection boards 13 and a plurality of wires C2. As shown in FIG. 5D, the driving circuit board 115 is electrically connected to the touch display panel 1 through two connection elements C1, a circuit connection board 13 and a plurality of wires C2.

Figure 6A:
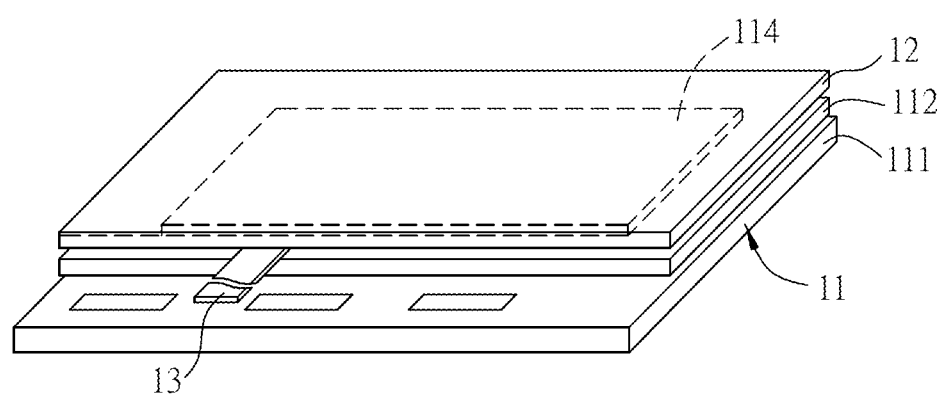
FIG. 6A is a schematic perspective diagram of a touch display panel according to a preferred embodiment of the invention.

FIG. 6A is a schematic perspective diagram of a touch display panel according to a preferred embodiment of the invention. The first polarization plate 113 is not shown in FIG. 6A.

The touch panel 12 overlaps the display panel 11. The first substrate 111 is located at a lower place, and the second substrate 112 is disposed above the first substrate 111. The area of the second substrate 112 is less than that of the first substrate 111. The area of the touch panel 12 is less than that of the first substrate 111 but equal to that of the second substrate 112. Between the touch panel 12 and the second substrate 112 is the second polarization plate 114, and the area of the second polarization plate 114 is less than that of each of the touch panel 12 and the second substrate 112. The circuit connection board 13 is connected to the touch panel 12, and at least partially overlaps the first and second substrates 111 and 112 in a direction perpendicular to the first substrate 111.

Figure 6B:
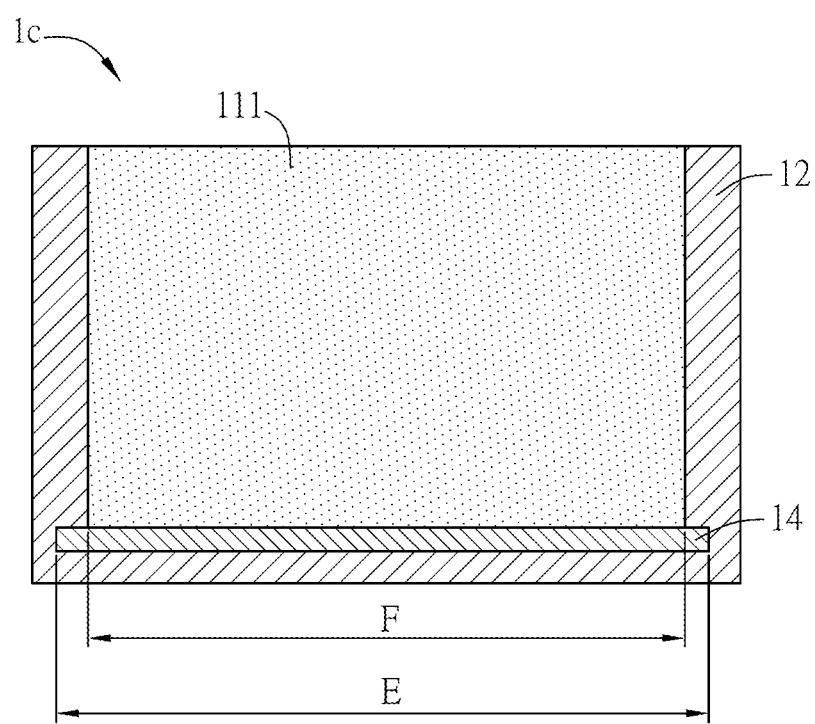
FIG. 6B is a schematic top view of another touch display panel according to the preferred embodiment of the invention.

FIG. 6B is a schematic top view of another touch display panel 1c according to the preferred embodiment of the invention.

Herein, the area of the touch panel 12 of the touch display panel 1c is greater than that of the first substrate 111 of the display panel 11c, and the area of the second substrate (not shown) is less than that of the first substrate 111. Besides, a buffer element 14 is disposed between the display panel 11c and the touch panel 12, and has a first width E. The portion of the first substrate 111 corresponding to the buffer element 14 has a second width F, and the first width E is greater than the second width F.

FIGS. 7A to 7K are perspective sectional diagrams schematically showing several variations of a touch display apparatus according to a preferred embodiment of the invention. The circuit connection board 13 is directly connected to the touch panel 12 to achieve the mutual electrical connection. Besides, the circuit connection board 13 can be electrically connected to the circuit board driving the touch panel 12 via the through hole of the adhesive element or plastic frame. The circuit connection board 13 is disposed over the first substrate 111, and that means at least a portion of the circuit connection board 13 overlaps the display panel 11. However, the circuit connection board 13 is not shown in FIGS. 7A to 7K. Besides, the area of the touch panel 12 can be less than, equal to or greater than that of the display panel 11.

Figure 7A:
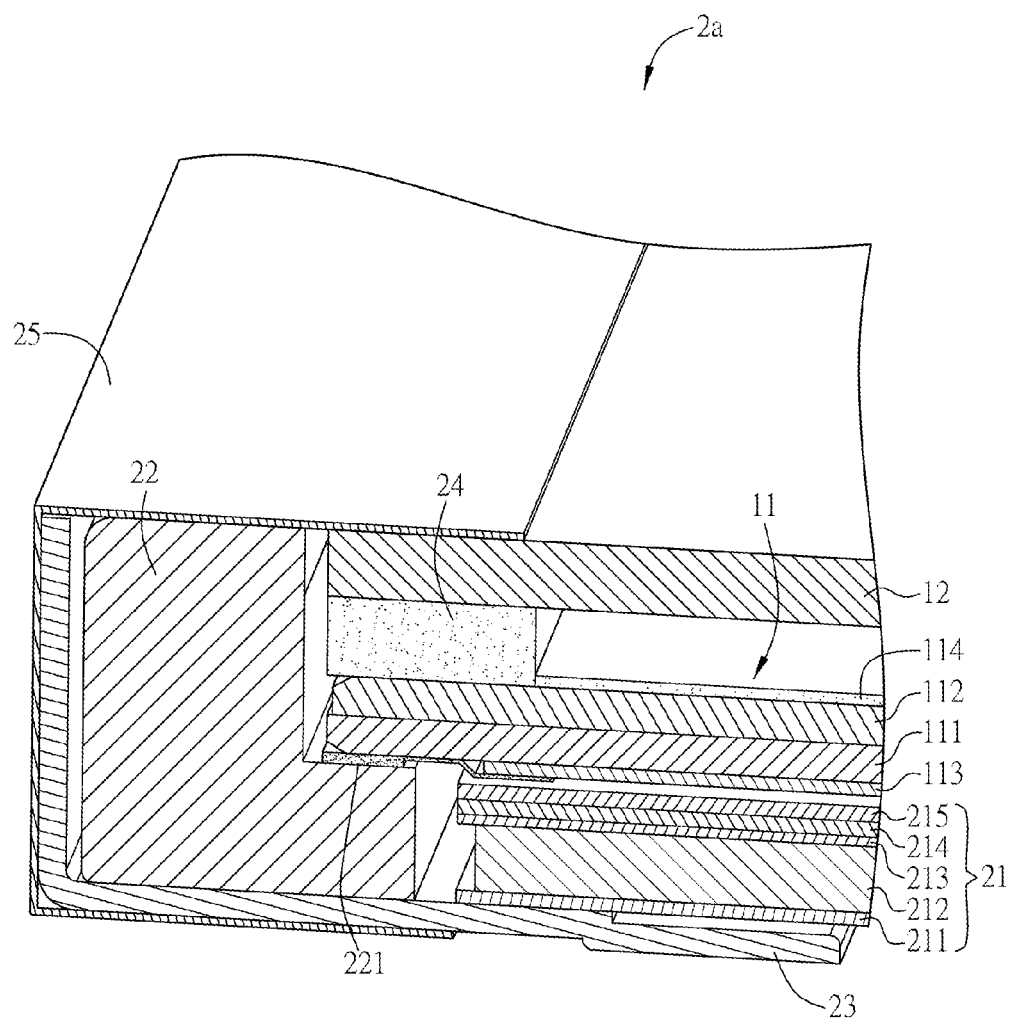
FIGS. 7A to 7K are perspective sectional diagrams schematically showing several variations of a touch display apparatus according to a preferred embodiment of the invention.

As shown in FIG. 7A, the touch display apparatus 2a includes a touch display panel and a backlight module 21. The touch display panel can have the technical features of at least one of the touch display panels 1, 1a and 1b, which are clearly illustrated in the above embodiments. Therefore, the touch display panel is not described here for conciseness.

The backlight module 21 is disposed on the side of the display panel 11 away from the touch panel 12. Herein, the backlight module 21 is disposed opposite the display panel 11, and can emit the light to the display panel 11 so that the display panel 11 can display images. In this embodiment, the backlight module 21 includes a reflective plate 211, a light guiding plate 212 and a plurality of optical films 213, 214, 215. The optical films 213 to 215 are, for example but not limited to, a light concentrating plate or diffusion plate each. Since the backlight module 21 can be embodied by the prior art and thus known by those skilled in the art, it is not described here for conciseness.

The touch display apparatus 2a further includes a plastic frame 22 and a rear frame 23. The plastic frame 22 can support the display panel 11, and thus the display panel 11 is disposed opposite the backlight module 21. Herein, the plastic frame 22 is adjacent to the backlight module 21. The display panel 11 and the touch panel 12 are disposed on the plastic frame 22, so that the first substrate 111, second substrate 112 and touch panel 12 are supported by a supporting surface 221 of the plastic frame 22. Besides, the rear frame 23 can accommodate the display panel 11, touch panel 12, backlight module 21 and plastic frame 22, and can provide protection for the collision, electromagnetic wave or electric shock. The rear frame 23 can be made by plastic material, metal or alloy for example.

In this embodiment, the touch panel 12, first substrate 111 and second substrate 112 have the same area and they are aligned with one another. The touch panel 12 and the display panel 11 are connected to each other by air bonding. Herein, an adhesive element 24 is disposed on the edge of the upper surface of the second substrate 112 to adhere to the touch panel 12. The adhesive element 214 can be disposed annularly or in a paste dispensing way. Moreover, in a paste dispensing way can reduce the cost while the annular disposition can provide a better connection effectiveness. The second polarization plate 114 is less than the second substrate 112 in area, and is thus surrounded by the adhesive element 24. Thereby, a gap is kept between the second polarization plate 114 and the touch panel 12. In other embodiments, an optical film (not shown) can be disposed within the gap for increasing the light output efficiency of the touch display apparatus 2a.

The touch display apparatus 2a can further include a light blocking element 25. The light blocking element 25 is, for example but not limited to, a light blocking adhesive tape, and extends from the outside of the rear frame 23 to the edge of the upper surface of the touch panel 12 for blocking the undesired side light and providing a fixing function. Herein, the light blocking element 25 adheres to the rear frame 23 and covers the partial touch panel 12, the plastic frame 22, and an edge and partial bottom of the rear frame 23.

Figure 7B:
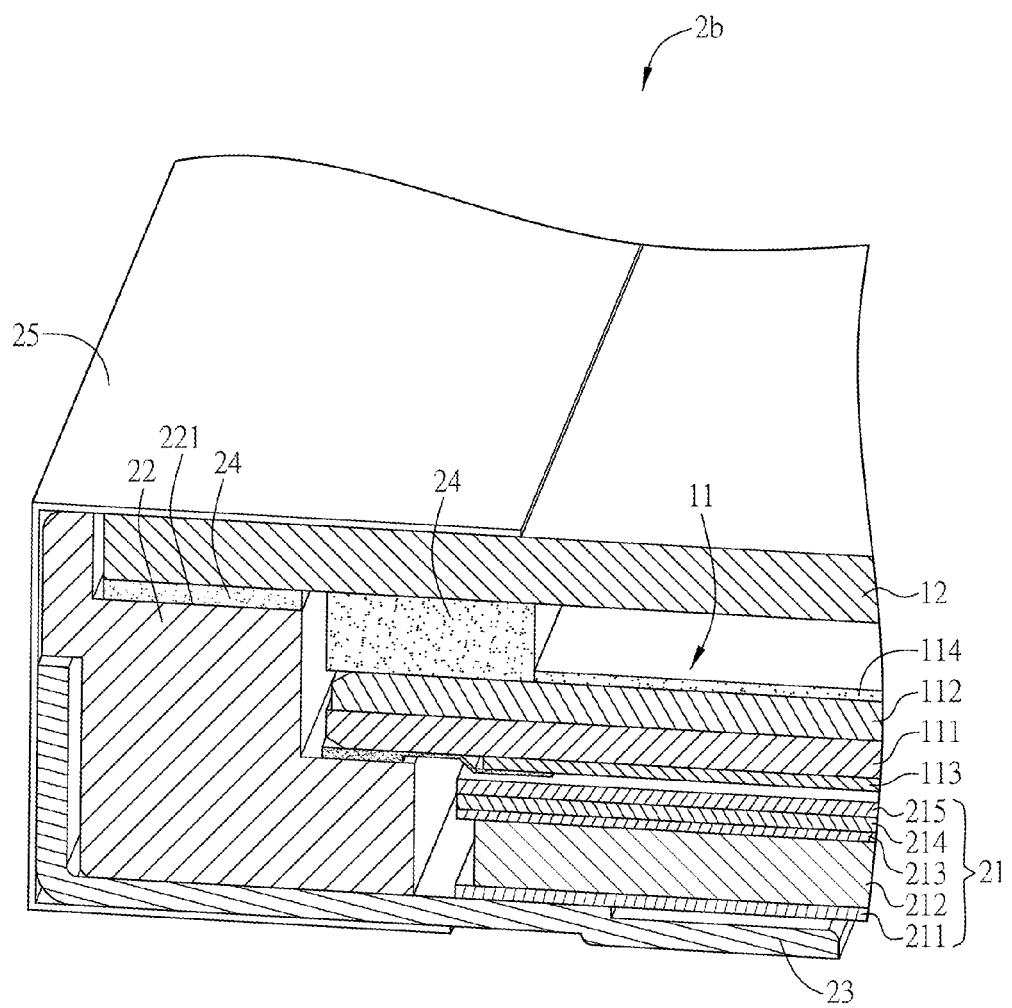

As shown in FIG. 7B, mainly different from the touch display apparatus 2a, the touch panel 12 of the touch display apparatus 2b is disposed beyond an edge of the display panel 11, and the shape of the plastic frame 22 is changed accordingly to limit the lateral movements of the touch panel 12 and display panel 11. Besides, another adhesive element 24 is disposed between the plastic frame 22 and the touch panel 12 and adheres to the supporting surface 221 of the plastic frame 22 for fixing the touch panel 12.

Figure 7C:
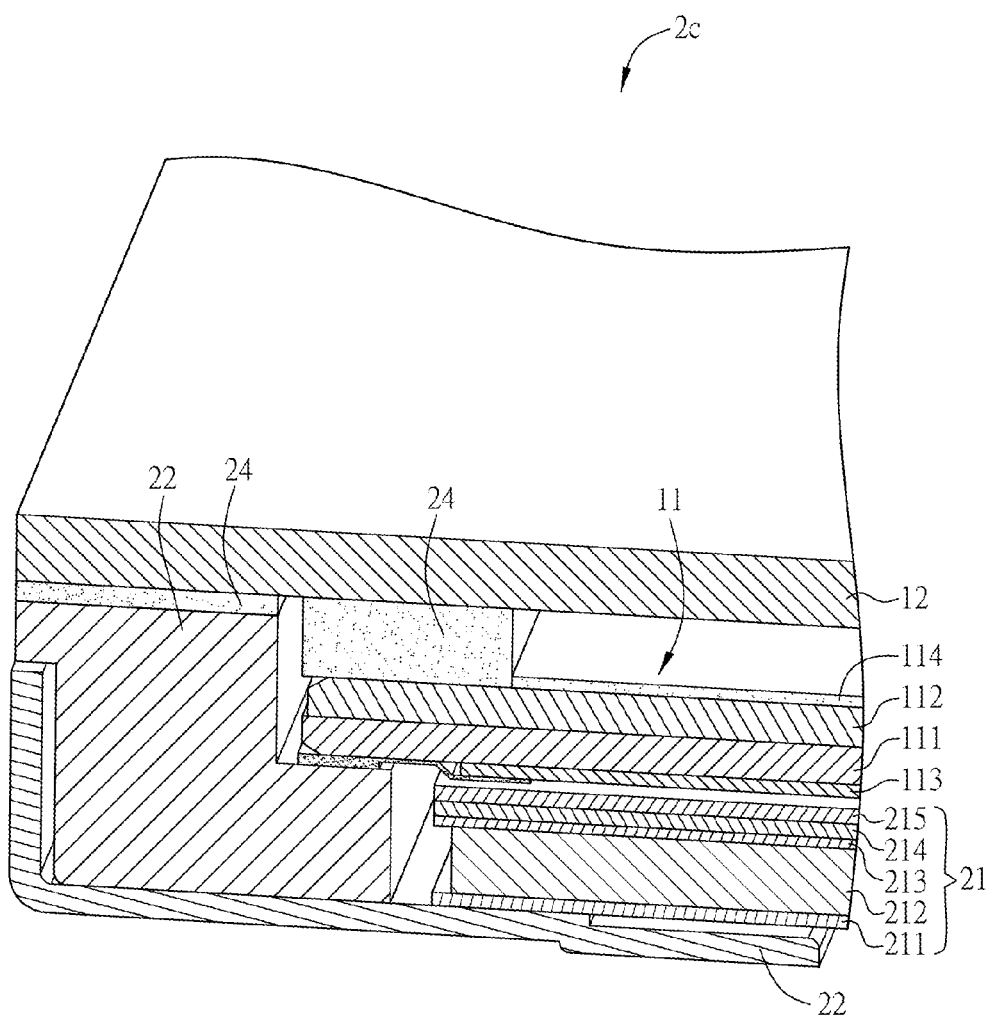

As shown in FIG. 7C, mainly different from the touch display apparatus 2b in FIG. 7B, the touch display apparatus 2c doesn't include the light blocking element 25 of FIG. 7B. Besides, the plastic frame 22 of the touch display apparatus 2c is slightly different from that of FIG. 7B in shape.

Figure 7D:
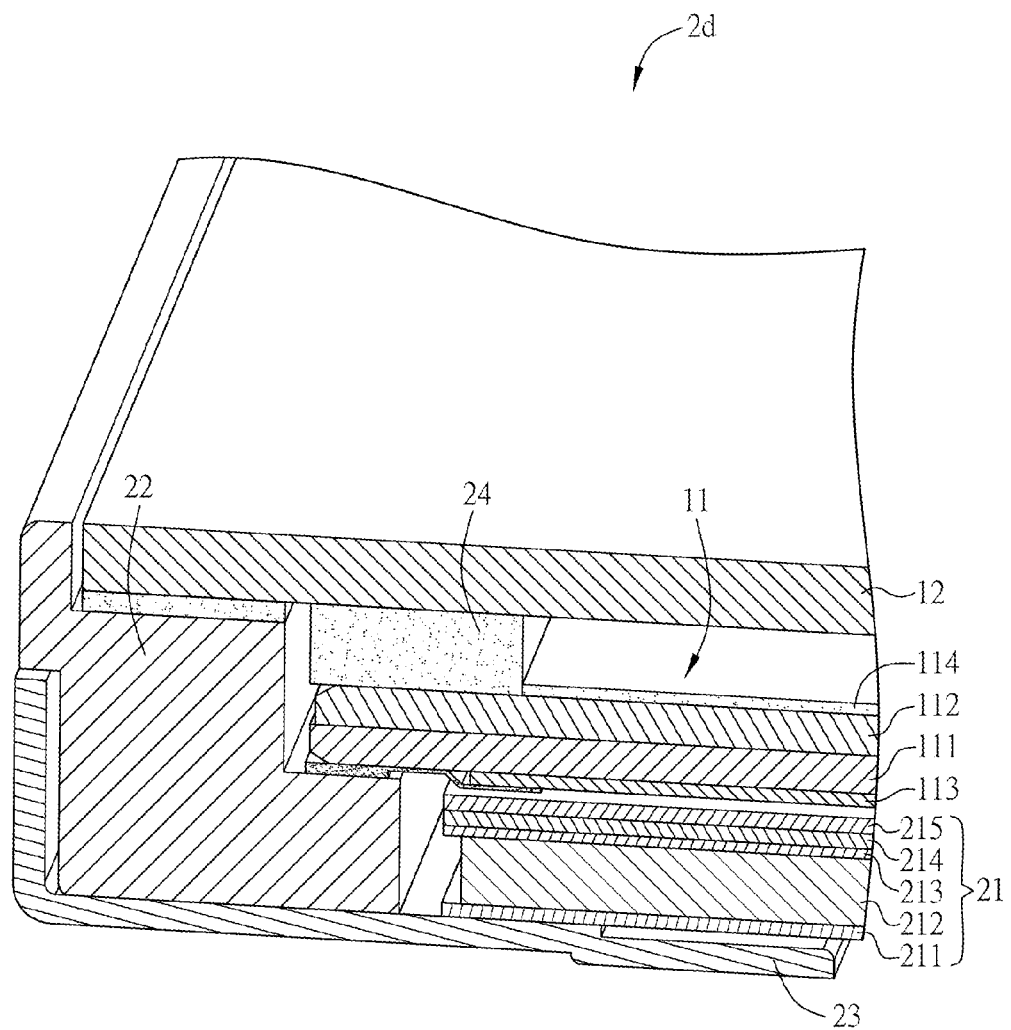

As shown in FIG. 7D, mainly different from the touch display apparatus 2b in FIG. 7B, the touch display apparatus 2d doesn't include the light blocking element 25 of FIG. 7B.

Figure 7E:
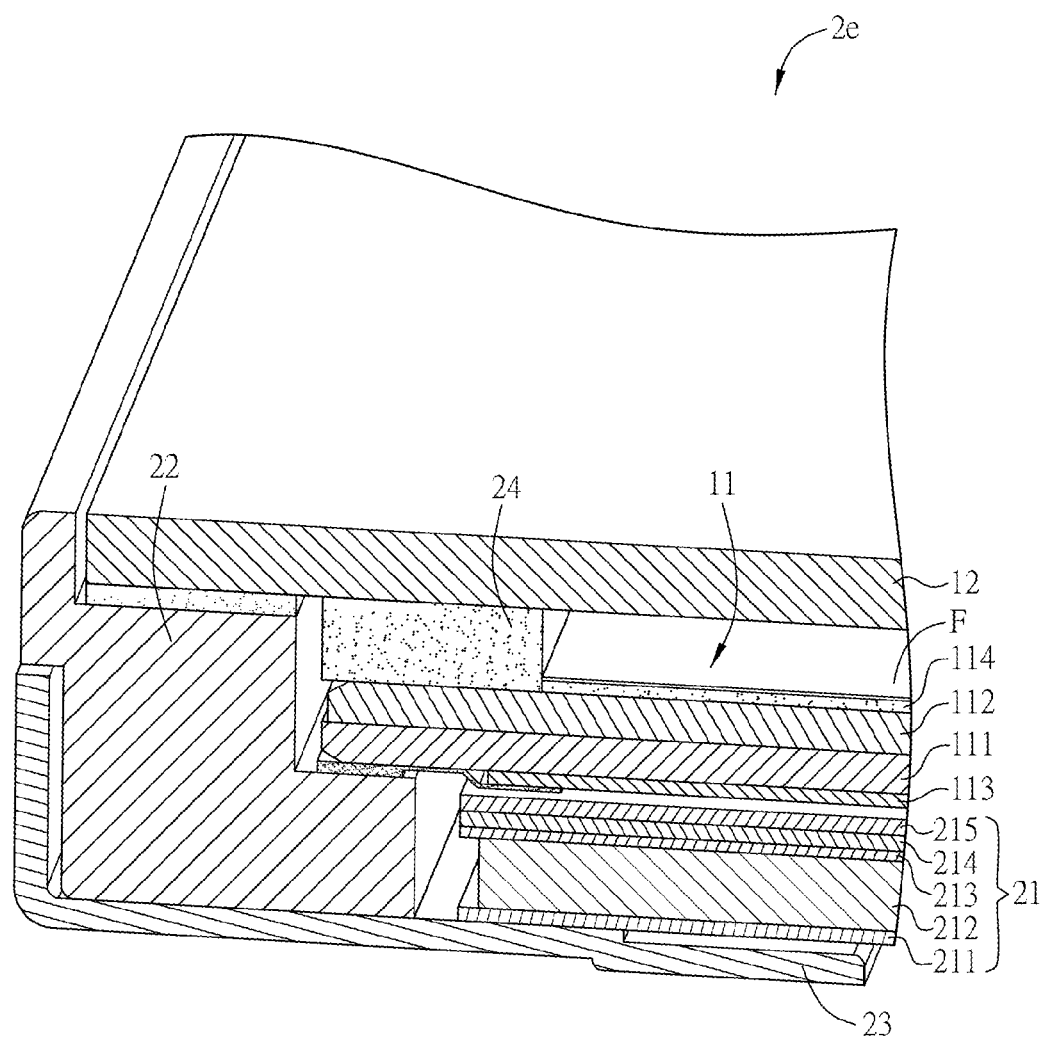

As shown in FIG. 7E, mainly different from the touch display apparatus 2d in FIG. 7D, the touch display apparatus 2e further includes an optical film F. The optical film F is disposed between the second substrate 112 and the touch panel 12 and connected to the second polarization plate 114 for reflecting and returning the light to the touch panel 12 in order to increase the light output efficiency. The optical film F is made by the material with high reflectance for example.

Figure 7F:
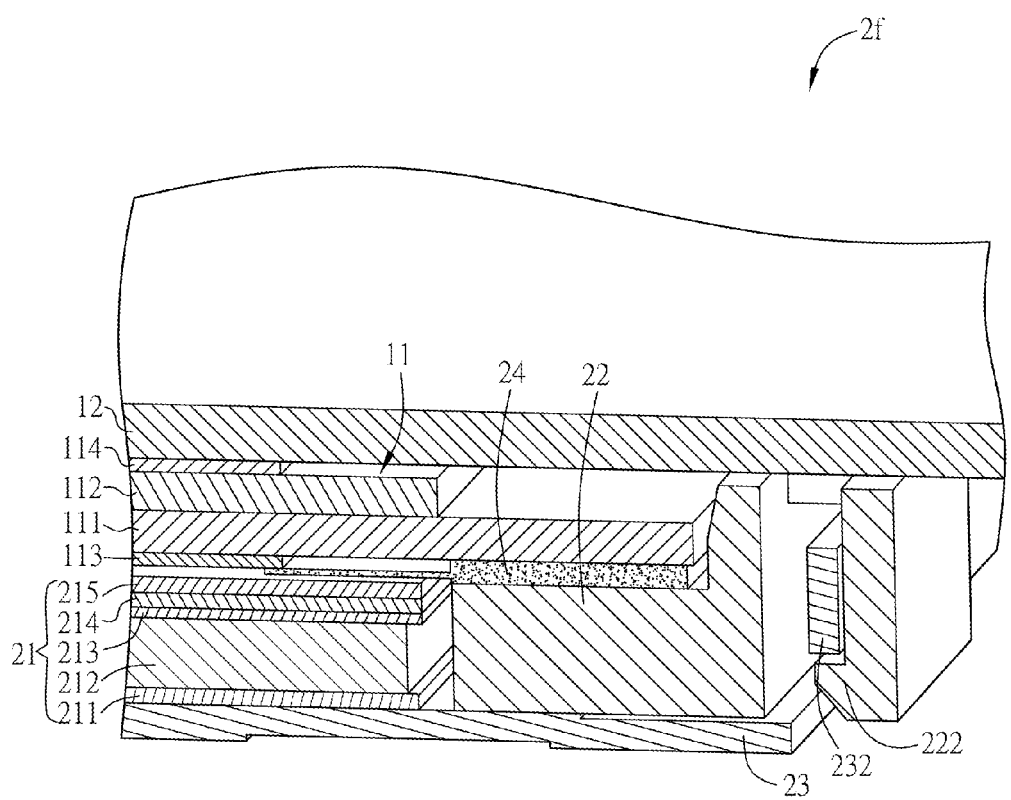

As shown in FIG. 7F, mainly different from the touch display apparatus 2c in FIG. 7C, the touch panel 12 and the display panel 11 of the touch display apparatus 2f are connected to each other by a direct bonding. The area of the second substrate 112 is less than that of the first substrate 111. Besides, the plastic frame 22 in FIG. 7F has a hook portion 222, and the hook portion 222 and a locking portion 232 of the rear frame 23 are locked by each other.

Figure 7G:
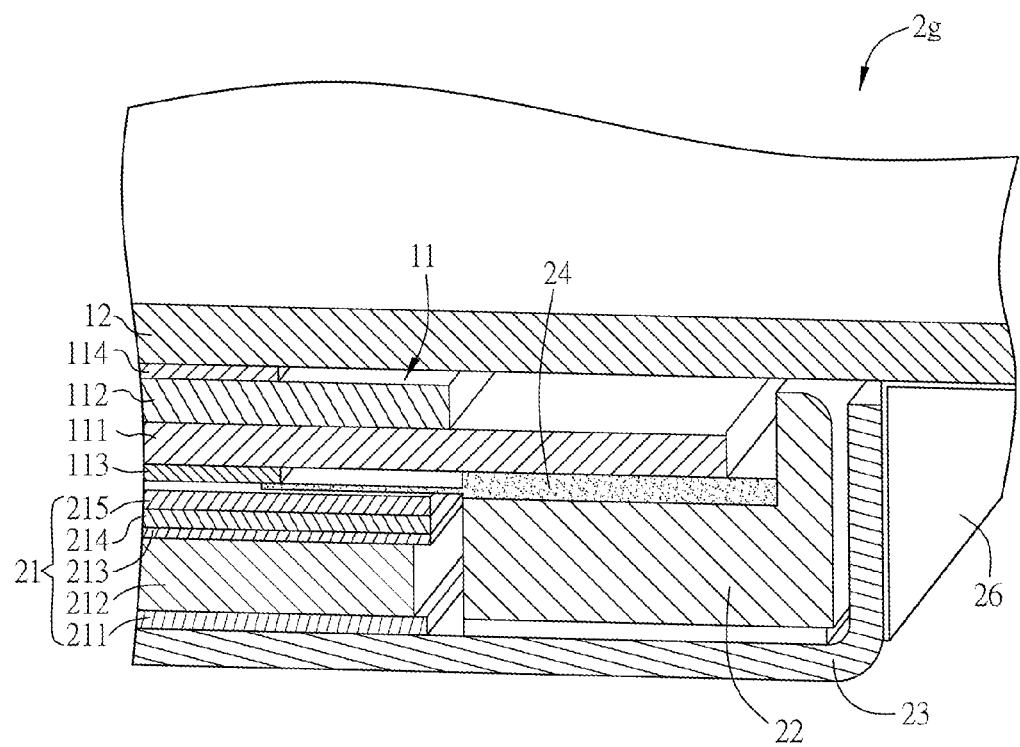

As shown in FIG. 7G, mainly different from the touch display apparatus 2f in FIG. 7F, the plastic frame 22 of the touch display apparatus 2g in FIG. 7G has no hook portion, and the rear frame 23 and the touch panel 12 are fixed together by an adhesive tape 26.

In comparison with the cases of FIGS. 7A to 7G, the cases of FIGS. 7H to 7K are designed as no plastic frame, and the adhesive element 24 adheres to, supports or connects to the display panel 11 and the touch panel 12.

Figure 7H:
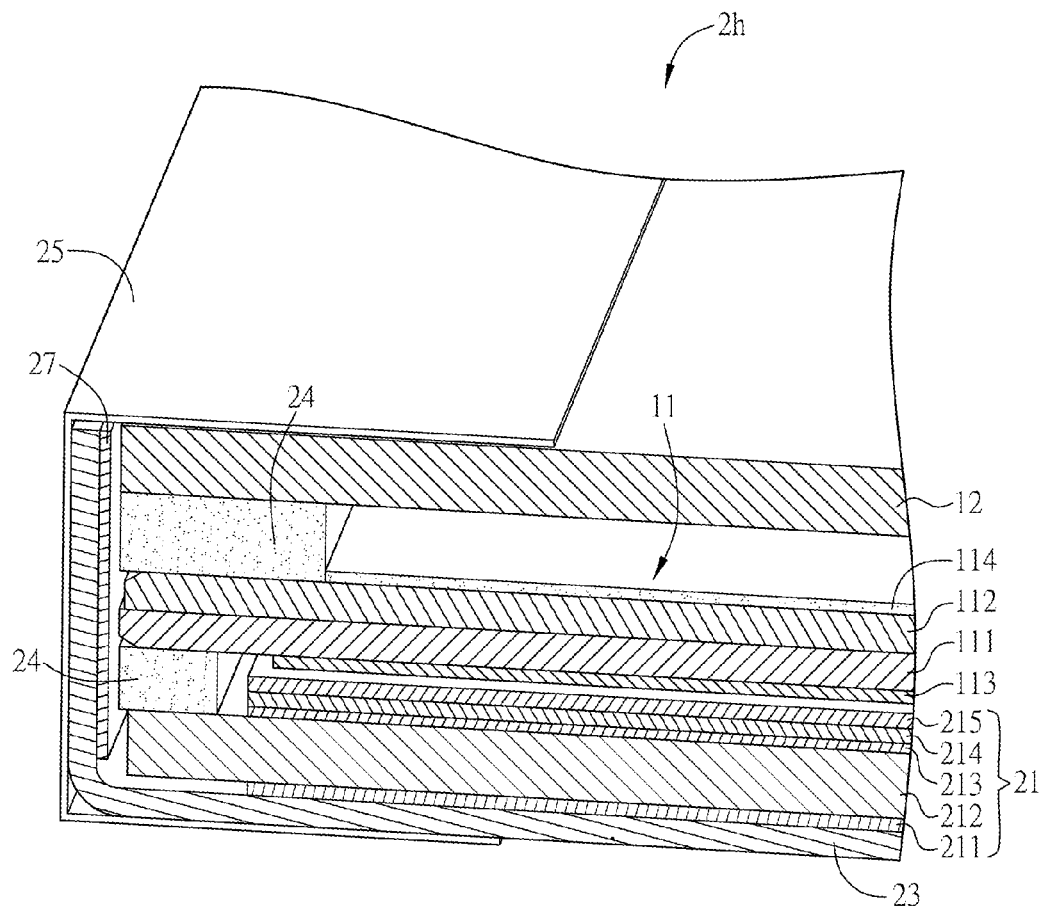

As shown in FIG. 7H, the touch panel 12 and display panel 11 of the touch display apparatus 2h are connected to each other by an air bonding, and thus the adhesive element 24 connects to the touch panel 12 and the display panel 11. The area of the touch panel 12 is substantially the same as that of each of the first and second substrates 111 and 112, and the touch panel 12 is aligned with the display panel 11. Besides, another adhesive element 24 is disposed between the display panel 11 and the light guiding plate 212 of the backlight module 21, and adheres to and supports them. Furthermore, a buffer element 27 is disposed among the rear frame 23, backlight module 21, display panel 11 and touch panel 12, and can absorb the vibration and the installation tolerance caused when the backlight module 21, display panel 11 and touch panel 12 are installed to the rear frame 23. Because this embodiment is designed as no plastic frame, the touch panel 12, display panel 11 and backlight module 21 are connected and fixed by the adhesive element 24.

Figure 7I:
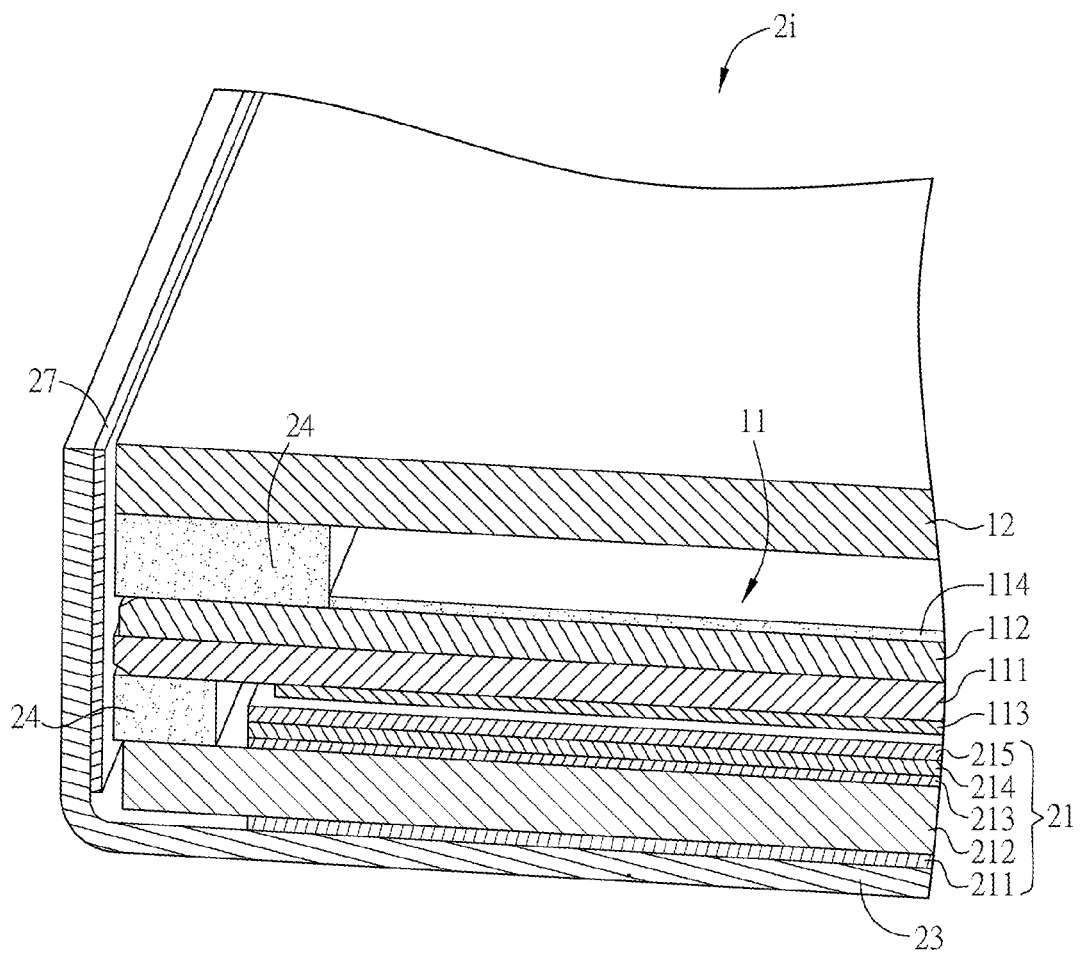

As shown in FIG. 7I, mainly different from the touch display apparatus 2h in FIG. 7H, the touch display apparatus 2i has no light blocking element 25 of FIG. 7H.

Figure 7J:
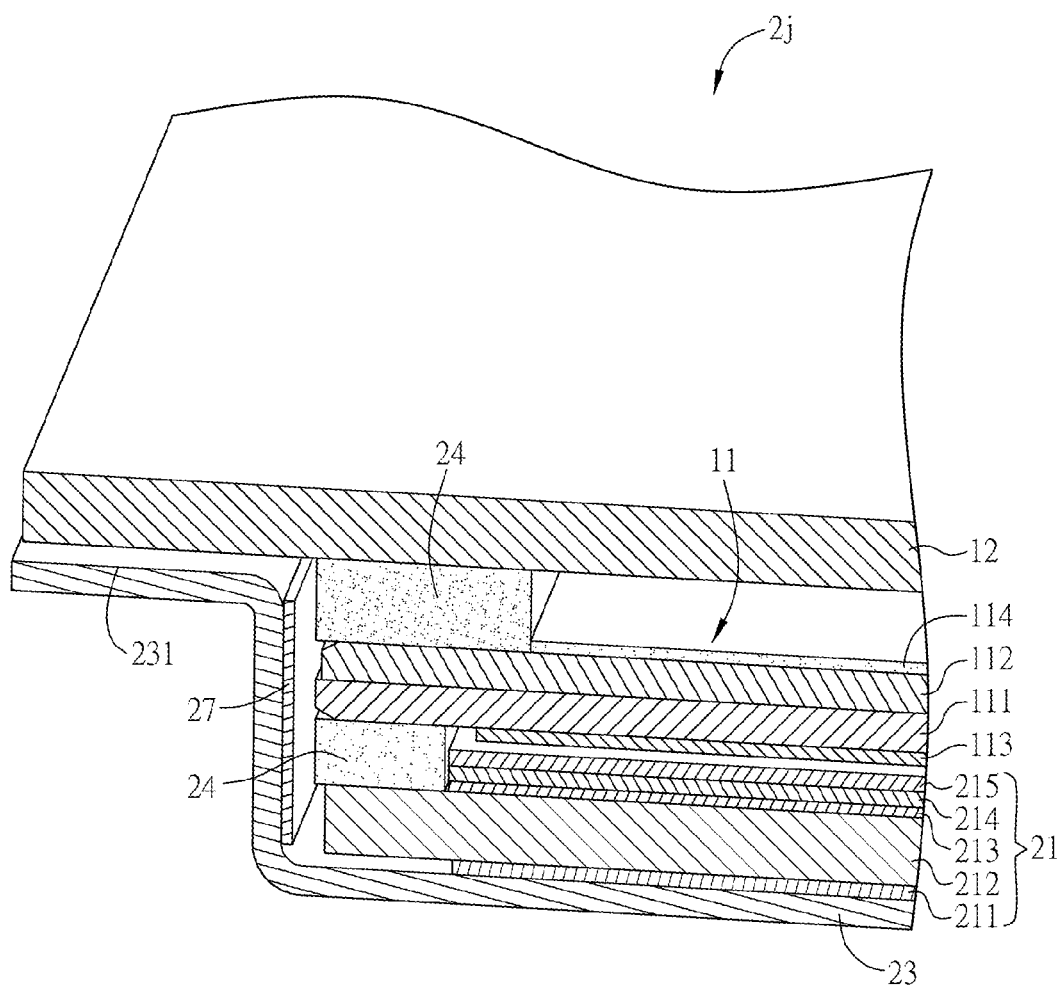

In FIG. 7J, mainly different from the touch display apparatus 2i in FIG. 7I, the touch panel 12 and display panel 11 of the touch display apparatus 2j are staggered, and the rear frame 23 is changed accordingly in shape. Thus, the touch panel 12 is supported by a supporting surface 231 of the rear frame 23.

Figure 7K:
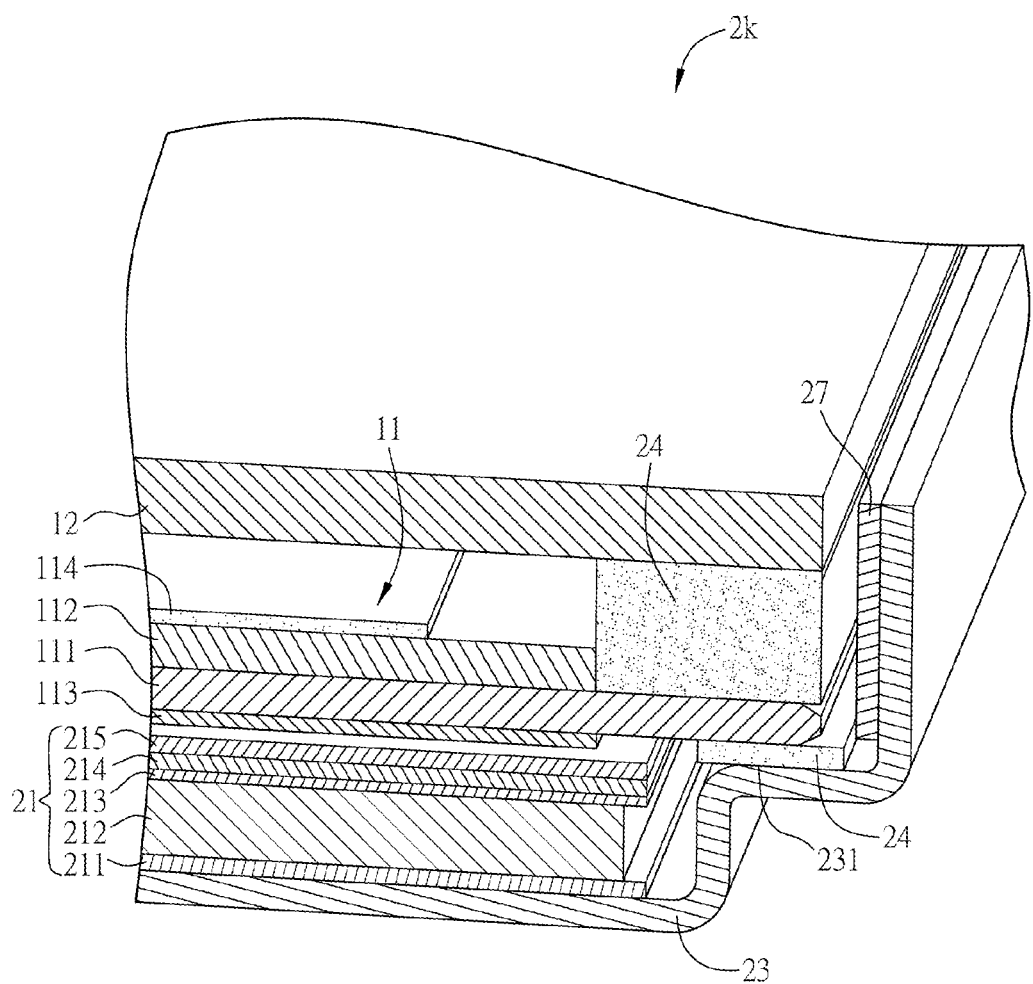

As shown in FIG. 7K, mainly different from the touch display apparatus 2j in FIG. 7J, the area of the touch panel 12 of the touch display apparatus 2k is substantially the same as that of the first substrate 111, and the touch panel 12 is aligned with the first substrate 111. But, the area of the second substrate 112 is less than that of the first substrate 111. Besides, the adhesive element 24 adheres to the touch panel 12 and the first substrate 111 so as to fix them. Furthermore, the rear frame 23 is changed in shape according to the areas of the first substrate 111 and touch panel 12, so that the rear frame 23 supports the first substrate 111 by the supporting surface 231 and another adhesive element 24.

Figure 8:
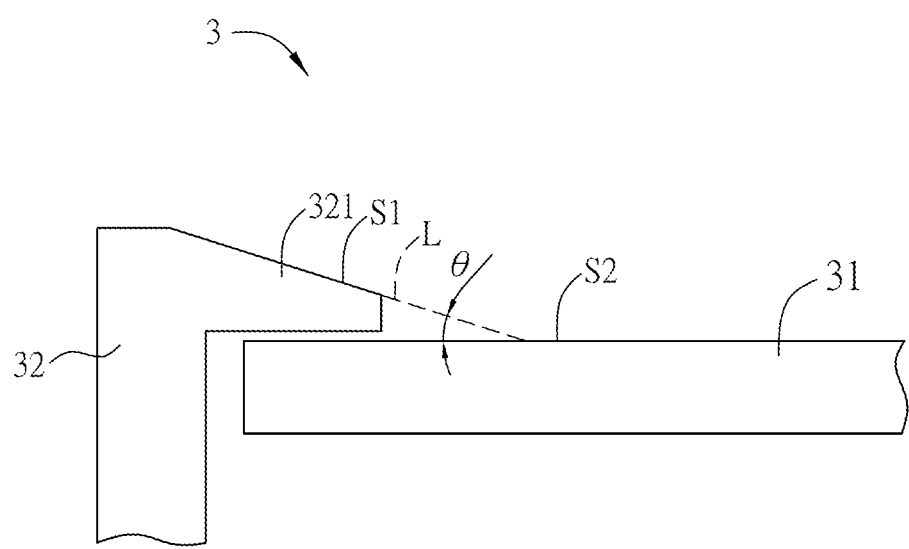
FIG. 8 is a schematic diagram of another touch display apparatus according to a preferred embodiment of the invention.

FIG. 8 is a schematic diagram of another touch display apparatus 3 according to a preferred embodiment of the invention. As shown in FIG. 8, the touch display apparatus 3 can be one of the touch display apparatuses 2a~2k. Except the touch display panel 31, the components of the touch display panel 31 (i.e. the display panel, touch panel, circuit connection board, plastic frame, rear frame, etc.) are not shown in FIG. 8.

Besides the touch display panel 31, the touch display apparatus 3 further includes a front frame 32, which is disposed at the edge of the touch display panel 31. Herein, the front frame 32 includes a blocking portion 321, which is disposed above the touch display panel 31 and covers an outer edge of the touch display panel 31. The blocking portion 321 has a surface S1, and an angle θ is formed between an extension L of the surface S1 and an upper surface S2 of the touch display panel 31. The angle θ can be between 5° and 30°.

In summary, in the touch display panel and touch display apparatus according to the invention, the touch panel is disposed over the display panel, and the circuit connection board is disposed on the touch panel and physically and electrically connected to the touch panel. Moreover, in a direction perpendicular to the display panel, at least a portion of the circuit connection board overlaps the first substrate of the display panel, or at least one side of the touch panel is disposed between the first substrate and the second substrate. Thereby, in comparison with the conventional on cell touch display panel and apparatus, the on cell touch display panel and apparatus of this invention are configured with innovative structures.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A touch display panel, comprising:
    a display panel including a first substrate and a second substrate which are disposed oppositely;
    a touch panel disposed over the display panel;
    a buffer element disposed between the display panel and the touch panel, wherein the buffer element has a first width in a top view of the touch display panel, the first substrate has a second width in the top view of the touch display panel, and the first width is greater than the second width; and
    a circuit connection board disposed on the touch panel and electrically connected to the touch panel,
    wherein at least a portion of the circuit connection board overlaps the first substrate in a direction perpendicular to the display panel.

2. The touch display panel as recited in claim 1, wherein the circuit connection board at least partially overlaps the second substrate in a direction perpendicular to the display panel.

3. The touch display panel as recited in claim 1, wherein the area of the touch panel is less than or equal to that of the first substrate in a direction perpendicular to the display panel.

4. The touch display panel as recited in claim 1, wherein the touch panel and the display panel are staggered.

5. The touch display panel as recited in claim 1, wherein the display panel further includes a first polarization plate and a second polarization plate, the first polarization plate is disposed on the side of the first substrate away from the second substrate, and the second polarization plate is disposed between the second substrate and the touch panel.

6. The touch display panel as recited in claim 5, wherein a gap between the touch panel and the second polarization plate is less than or equal to 0.1 mm.

7. The touch display panel as recited in claim 1, wherein the display panel includes a driving circuit board, and the touch panel is electrically connected to the driving circuit board through the circuit connection board.

8. A touch display apparatus, comprising:
    a touch display panel including a display panel, a touch panel, a buffer element and a circuit connection board, wherein the display panel includes a first substrate and a second substrate which are disposed oppositely, the touch panel is disposed over the display panel, the buffer element is disposed between the display panel and the touch panel and has a first width in a to view of the touch display panel, the first substrate has a second width in the to view of the touch display panel, and the first width is greater than the second width, the circuit connection board is disposed on the touch panel and physically and electrically connected to the touch panel, and at least a portion of the circuit connection board overlaps the first substrate in a direction perpendicular to the display panel; and
    a backlight module disposed on the side of the display panel away from the touch panel.

9. The touch display apparatus as recited in claim 8, wherein the circuit connection board at least partially overlaps the second substrate in a direction perpendicular to the display panel.

10. The touch display apparatus as recited in claim 8, wherein the area of the touch panel is less than or equal to that of the first substrate in a direction perpendicular to the display panel.

11. The touch display apparatus as recited in claim 8, wherein the touch panel and the display panel are staggered.

12. The touch display apparatus as recited in claim 8, wherein the display panel includes a driving circuit board, and the touch panel is electrically connected to the driving circuit board through the circuit connection board.

13. The touch display apparatus as recited in claim 8, further comprising:
    a plastic frame which is adjacent to the backlight module, wherein the display panel and the touch panel are disposed to the plastic frame; and a rear frame to which the plastic frame, the backlight module, the display panel and the touch display are disposed.

14. The touch display apparatus as recited in claim 8, further comprising:
    an adhesive element by which the touch panel, the display panel and/or the backlight module are connected together; and
    a rear frame to which the adhesive element, the backlight module, the display panel and the touch display are disposed.

15. The touch display apparatus as recited in claim 13, wherein the plastic frame and the rear frame are connected to each other by locking or adhering.

16. The touch display apparatus as recited in claim 14, further comprising:
    a light blocking element disposed at the outside of the rear frame.

17. The touch display apparatus as recited in claim 14, further comprising:
    a front frame disposed at an edge of the touch display panel and including a blocking portion which is disposed above the touch display panel and has a surface, wherein an angle is formed between an extension of the surface and an upper surface of the touch display panel and is between 5° and 30°.

18. A touch display panel, comprising:
    a display panel including a first substrate and a second substrate which are disposed oppositely;
    a touch panel disposed over the display panel and staggered with the display panel;
    a buffer element disposed between the display panel and the touch panel, wherein the buffer element has a first width in a top view of the touch display panel, the first substrate has a second width in the top view of the touch display panel, and the first width is greater than the second width; and
    a circuit connection board disposed on the touch panel and electrically connected to the touch panel,
    wherein at least a side of the touch panel is disposed between the first substrate and the second substrate in a direction perpendicular to the display panel.

19. The touch display panel as recited in claim 18, wherein at least a portion of the circuit connection board overlaps the first substrate in a direction perpendicular to the display panel.

\* \* \* \* \*